US011361656B2

(12) United States Patent
Marben et al.

(10) Patent No.: US 11,361,656 B2
(45) Date of Patent: *Jun. 14, 2022

(54) WIRELESS CONTROL IN A CABLE FEEDER AND PULLER SYSTEM

(71) Applicant: Greenlee Tools, Inc., Rockford, IL (US)

(72) Inventors: Daniel John Marben, Rockford, IL (US); Eric Williams, Rockford, IL (US); SatishKumar SivaSankaran, Rockford, IL (US); Deraid Damitric Woods, Rockford, IL (US)

(73) Assignee: Greenlee Tools, Inc., Rockford, IL (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/005,885

(22) Filed: Aug. 28, 2020

(65) Prior Publication Data

US 2022/0068117 A1     Mar. 3, 2022

(51) Int. Cl.
    *G08C 17/02*     (2006.01)
    *H02G 1/08*     (2006.01)

(52) U.S. Cl.
    CPC .............. *G08C 17/02* (2013.01); *H02G 1/08* (2013.01); *G08C 2201/30* (2013.01); *G08C 2201/50* (2013.01)

(58) Field of Classification Search
    CPC ............... G08C 17/02; G08C 2201/30; G08C 2201/50; H02G 1/08; G05B 19/0428
    See application file for complete search history.

(56) References Cited

U.S. PATENT DOCUMENTS

| | | | | |
|---|---|---|---|---|
| 4,839,533 A | * | 6/1989 | Aga | H01H 3/022 |
| | | | | 307/115 |
| 5,734,206 A | * | 3/1998 | Keizer | F24C 7/08 |
| | | | | 307/116 |

(Continued)

FOREIGN PATENT DOCUMENTS

| | | |
|---|---|---|
| KR | 101486212 B1 | 1/2015 |
| KR | 20150103466 A * | 9/2015 |

OTHER PUBLICATIONS

"Southwire Tools & Equipment Operating Instructions—Southwire, Triggers, Wireless Safety Switch System TSS-01," Southwiretools.com, 2018, 69 pages.

(Continued)

*Primary Examiner* — Adnan Aziz
(74) *Attorney, Agent, or Firm* — Klintworth & Rozenblat IP LLP

(57) ABSTRACT

A control module for controlling a cable pulling or feeding apparatus at one endpoint of a pulling operation and for wirelessly communicating with a cable feeding or pulling apparatus at an opposite endpoint. The control module includes a switch input to receive a start signal from a switch for initiating operation of the apparatus and an equipment output that connects to the pulling/feeding apparatus. A wireless communication interface communicates ready state or stop state messages to the other apparatus to coordinate a pulling operation. The control module operates in one of two modes: endpoint mode or repeater mode. In repeater mode, the control module may be positioned between the endpoints to extend the wireless communications between the endpoints.

19 Claims, 9 Drawing Sheets

(56) References Cited

U.S. PATENT DOCUMENTS

| | | |
|---|---|---|
| 7,723,630 B1 | 5/2010 | Jordan et al. |
| 8,058,578 B1 | 11/2011 | Jordan et al. |
| 8,485,501 B1 | 7/2013 | Hard |
| 10,076,809 B2 | 9/2018 | Rappl et al. |
| 10,345,170 B2 | 7/2019 | Jubeck et al. |
| 2010/0141578 A1* | 6/2010 | Horiuchi .......... H04N 21/42204 345/158 |
| 2011/0227012 A1* | 9/2011 | Wang ...................... H02G 1/08 254/134.5 |
| 2015/0068318 A1* | 3/2015 | Bardin .................. G08C 17/02 73/828 |
| 2016/0045971 A1 | 2/2016 | Holverson |
| 2017/0050257 A1 | 2/2017 | Leiteritz et al. |
| 2017/0097627 A1 | 4/2017 | Bardlin et al. |
| 2017/0248481 A1* | 8/2017 | Bubar .................. H01H 17/16 |
| 2018/0013270 A1* | 1/2018 | Jubeck .................. G01L 1/125 |
| 2019/0341752 A1 | 11/2019 | Radichel et al. |
| 2019/0344371 A1 | 11/2019 | Denis et al. |
| 2020/0158091 A1* | 5/2020 | Sen ......................... F03D 17/00 |

OTHER PUBLICATIONS

"Southwire Tools & Equipment Operating Instructions—Southwire, Triggers, Wireless Safety Switch System TSS-01," Southwiretools.com, 2016, 20 pages.

English Machine Translation of KR 10-1486212 B1.

"Notification of Transmittal of the International Search Report and the Written Opinion of the International Searching Authority, or the Declaration," PCT/US2021/048038, dated Dec. 21, 2021.

"Written Opinion of the International Searching Authority," PCT/US2021/048038, dated Dec. 21, 2021.

"International Search Report," PCT/US2021/048038, dated Dec. 21, 2021.

* cited by examiner

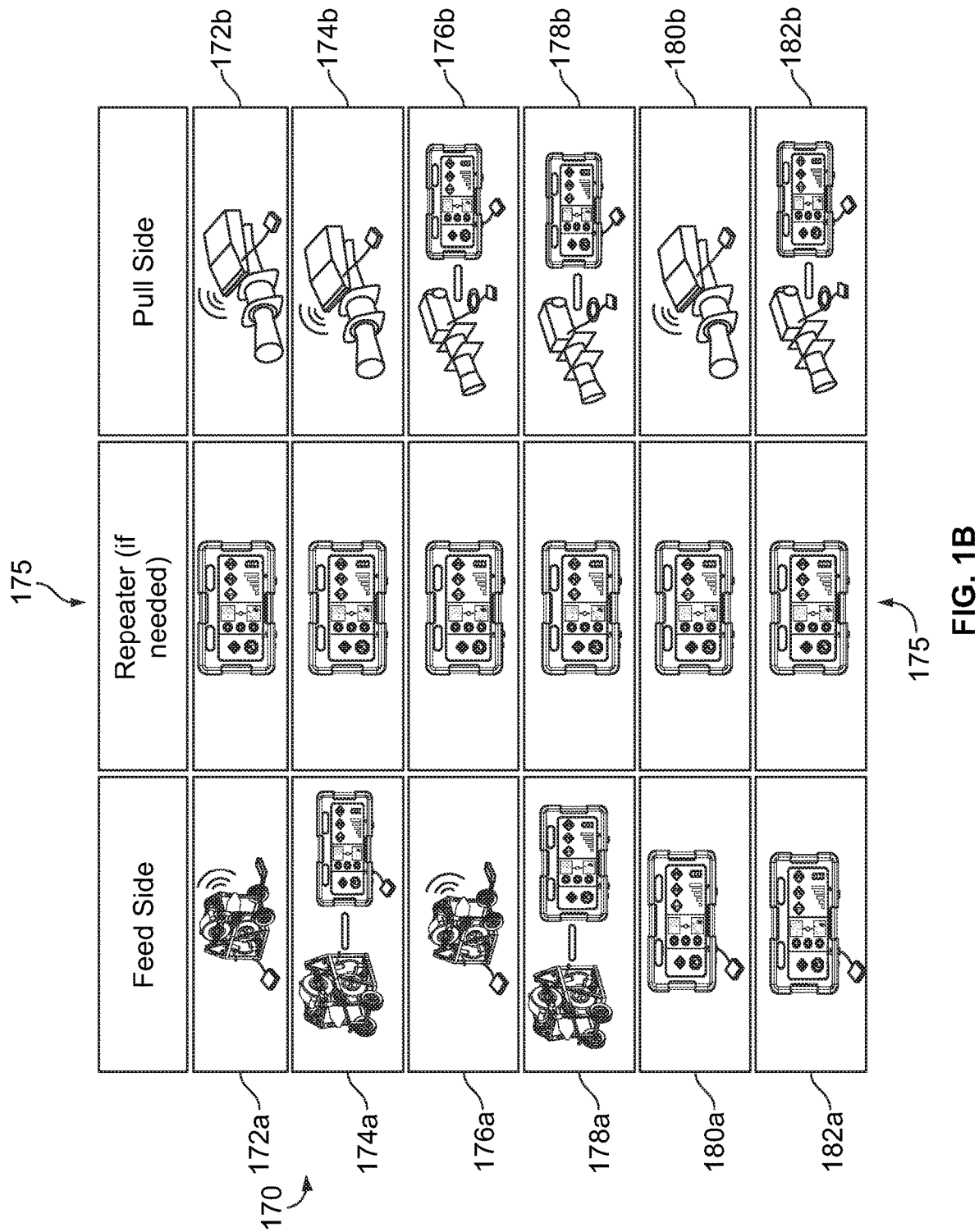

WIRELESS CONTROL IN A CABLE FEEDER AND PULLER SYSTEM

FIELD OF THE DISCLOSURE

The present disclosure relates to wireless control in a cable installing system.

BACKGROUND

When cables, such as electrical, coaxial, telephone cables, etc. are first installed in a building, the cables are typically run through a conduit which has been previously installed in the walls of the building. The process for running the cables through the conduit typically starts with a worker shooting or blowing a "mouse" (a form of a foam plug) through the conduit where the mouse is connected to the end of a strong, lightweight nylon cord. Blowing of the mouse is achieved by placing the mouse in the conduit and applying air pressure behind the mouse to force it through the conduit. The mouse has a diameter which is slightly less than the diameter of the conduit. Therefore, the air pressure which is applied behind the mouse causes the mouse to move through the conduit, pulling the lightweight nylon cord with it.

After the mouse has been blown through the conduit such that the mouse appears at the other end of the conduit, a pulling rope, such as a heavier synthetic rope or steel cable, is connected to the end of the nylon cord, and the nylon cord is pulled back through the conduit so that the pulling rope is pulled through the conduit. Once the nylon cord has been pulled completely back through the conduit and the end of the pulling rope appears at the end of the conduit, a grouping of cables, where each cable is carried on an individual spool, reel or the like, is connected to the end of the pulling rope which has not yet entered the conduit. Then, the pulling rope is pulled completely through the conduit as the cables unwind from their respective spools, reels or the like, and the cables advance in the conduit. Once the cables appear at the end of the conduit, the cables are disconnected from the pulling rope, and the installation of the cables in the conduit is complete.

The pulling rope and attached cables are typically pulled by a cable puller. A cable feeder is often used to reduce the load on the cable puller by applying a tractive force on the cable bundle, to unload the cables from the spools, as it enters the conduit. The cable puller and, when used, a cable feeder, form a cable installing system.

The cable puller and cable feeder may include motorized rotating members to generate the pulling and feeding forces needed to run the cable through the conduit. Such cable installing systems may be particularly advantageous in installations where the cable is large and when the conduit path is long or where the conduit path has one or more bends or when the conduit path traverses structures that block the line of sight between the endpoints. In such installations, a communication link may likely be needed between the operator of the cable puller and the operator of the cable feeder. The communications link allows the operators at the endpoints of the installation to inform each other as to when each is ready to start the operation of the equipment or if the operation should stop due to problems, or when the operation is complete and should be stopped. Current cable installation systems rely on the use of standard radio, mobile phones, or other two-way, two-person communications systems. As a result, coordination between operators of the puller/feeder equipment can be impeded by communication issues, such as noise, poor signals between the communications devices used.

SUMMARY

In view of the above, a control module is provided in a cable installing system for wirelessly communicating between a first apparatus and a second apparatus. The first apparatus is either a cable pulling apparatus or a cable feeding apparatus at a first endpoint and the second apparatus is either a cable feeding apparatus or a cable pulling apparatus at a second endpoint. In some implementations, only a cable pulling apparatus is used and the control module may be used to coordinate the cable installation between two operators. The control module is connected for operation at the first apparatus and includes a switch input configured to receive an operator input signal from a user-actuated switch. An equipment output on the control module is configured to send a start signal to initiate operation of the apparatus connected to the equipment output. A wireless communication interface transmits an apparatus status signal indicating a ready state or a stop state for the apparatus. The control module includes a processor configured to execute stored machine instructions to:
  receive the operator input signal and transmit via the wireless communication interface a ready message indicating readiness of the apparatus to the second endpoint,
  receiving a ready state signal indicating readiness at the second endpoint via the wireless communication interface,
  initiating operation of the apparatus by sending the start signal to the apparatus via the equipment output responsive to receiving the ready state signal.

In one aspect, the apparatus is a first apparatus, and the wireless communication interface is configured to transmit the apparatus status signal to a second apparatus having an integrated wireless communication interface and an apparatus controller configured to communicate the ready state signal via the integrated wireless communication interface.

In another aspect, the apparatus is a first apparatus, the control module is a first control module, and the cable installing system comprises the first apparatus and a second apparatus connected to a second control module.

In another aspect, the first apparatus is either a cable pulling apparatus or a cable feeding apparatus, the second apparatus is either a cable feeding apparatus or a cable pulling apparatus, the apparatus status signal is a first apparatus status signal, and the second apparatus transmits a second apparatus status signal. The control module includes a display configured to display a puller status indicator according to the ready state or stop state of the cable pulling apparatus and a feeder apparatus status indicator according to the ready state or stop state of the cable feeding apparatus. The processor illuminates the puller status indicator responsive to receiving the operator input signal and the feeder status indicator responsive to receiving the second apparatus status signal when the first apparatus is the cable pulling apparatus. The processor also illuminates the feeder status indicator responsive to receiving the operator input signal and the puller status indicator responsive to receiving the second apparatus status signal when the first apparatus is the cable feeding apparatus.

In another aspect, the control module includes a puller endpoint mode selector to indicate a puller endpoint mode when an operator presses the puller endpoint mode selector and the first apparatus is the cable pulling apparatus. The control module also includes a feeder endpoint mode selector to indicate a feeder endpoint mode when the operator presses the feeder endpoint mode selector and the first apparatus is the cable feeding apparatus.

In another aspect, the control module includes a repeater mode selector configured to trigger the processor to enter a repeater mode when selected by the operator. In the repeater mode, the control module receives wireless signals at the wireless communications interface and transmits the received wireless signals at a higher power.

BRIEF DESCRIPTION OF THE DRAWINGS

FIG. 1B is a table of configurations of cable installing systems in which example implementations may be advantageously used.

DETAILED DESCRIPTION

Figure 1A:
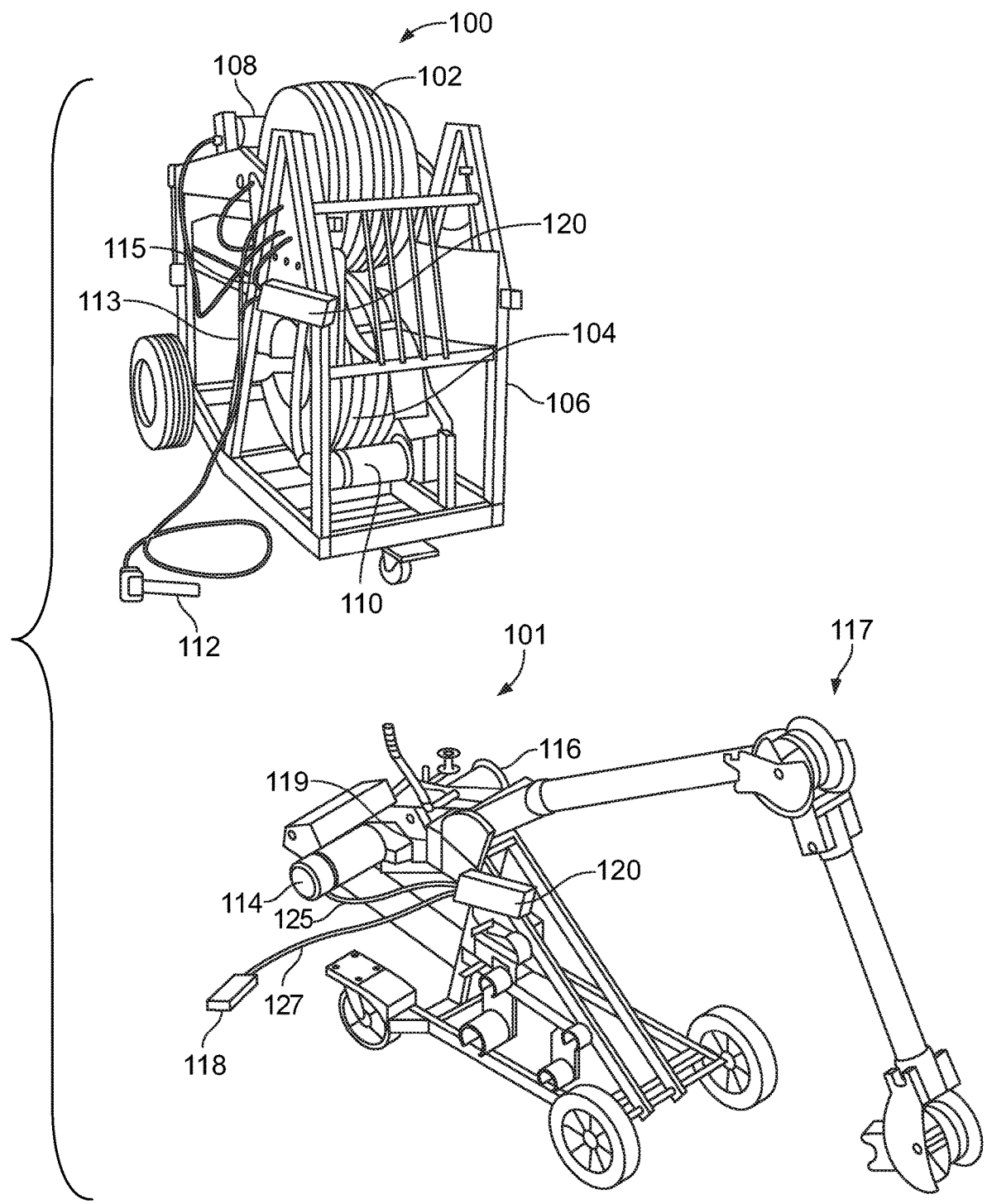
FIG. 1A is an isometric view of an example cable feeder and cable puller configured to operate using an example implementation of a control module.

While the disclosure may be susceptible to embodiment in different forms, there is shown in the drawings, and herein will be described in detail, example embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 2:
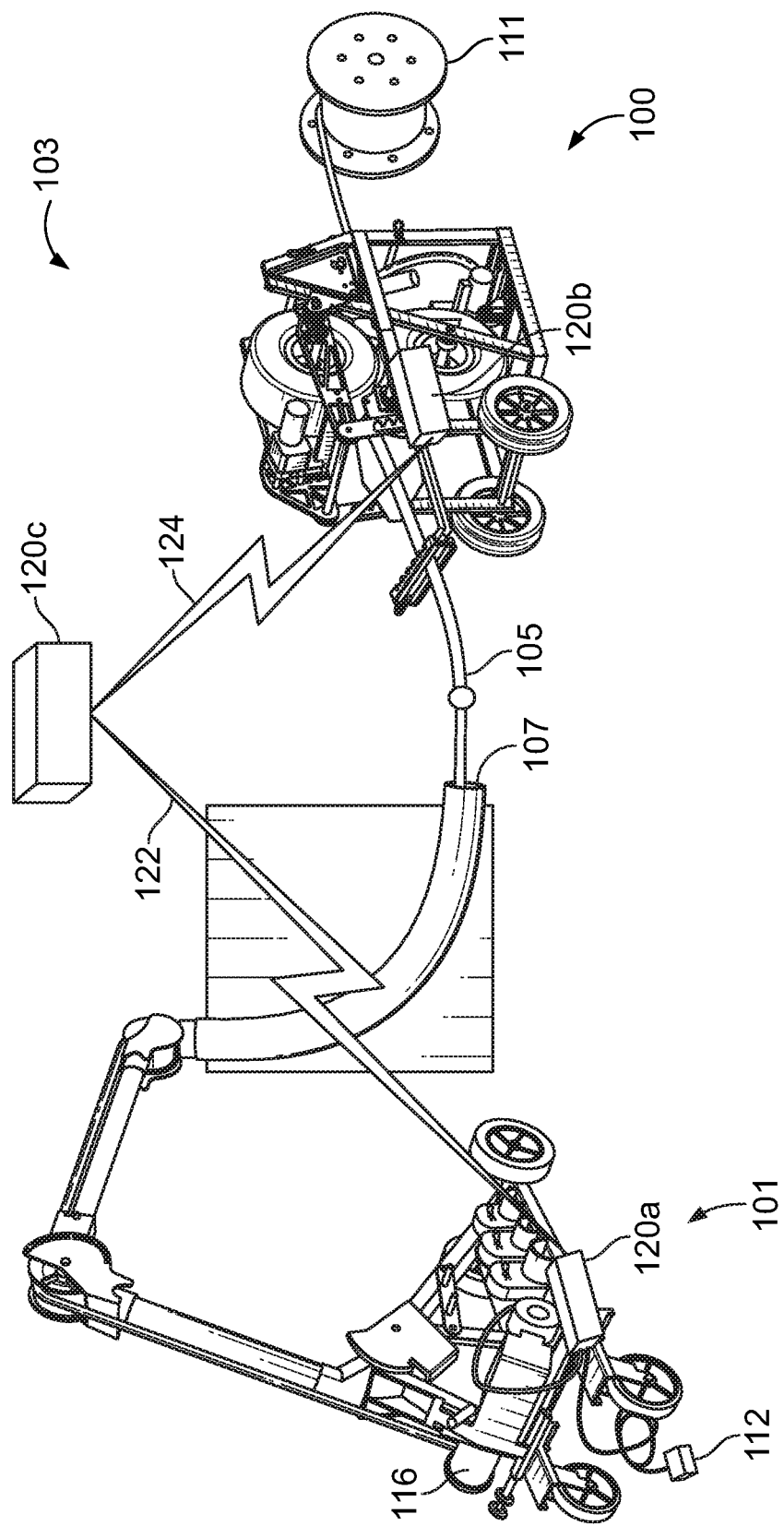
FIG. 2 is an isometric view of an example implementation of a cable feeder and an example implementation of a cable puller illustrating operation of the cable installing system using the example implementation of the control module.

FIG. 1A is an isometric view of an example cable feeding apparatus 100 and an example cable pulling apparatus 101 configured to operate using an example implementation of a control module 120. A cable installing system may include a cable feeding apparatus 100 and cable pulling apparatus 101 each controlled by a control module 120 during a cable installation operation. The cable installing system may take the form of several configurations as described below with reference to FIG. 1B. FIG. 2 is an isometric view of an example implementation of the cable feeding apparatus 100 and an example implementation of the cable pulling apparatus 101 illustrating operation of a cable installing system 103 using the example implementation of the control module 120.

Referring to FIGS. 1A and 2, the cable feeding apparatus 100 feeds a cable 105 through a conduit 107 and the cable 105 is pulled by the cable pulling apparatus 101 during a cable installation process. The single pulling cable 105 may be pulled from a single reel 111 as shown in FIG. 2, or multiple pulling ropes/cables (not shown). The pulling rope(s)/cable(s) 105 pass through the cable feeding apparatus 100 and then into the conduit 107.

The example cable feeding apparatus 100 in FIGS. 1A and 2 includes upper and lower rotating members 102, 104 mounted on a frame 106. Each rotating member 102, 104 may be a pneumatic tire whose internal air pressure can be selectively varied when pressed against each other and with the cable 105 therebetween. Motors 108, 110 are mounted to the frame 106 and are drivably connected to the respective rotating members 102, 104 to cause rotation of the rotating members 102, 104 to pull the pulling rope(s)/cable(s) 105 therethough for forwarding to the conduit 107. In an embodiment, each motor 108, 110 may be a permanent magnet DC motor. The control module 120 may be mounted anywhere on the frame 106 of the cable feeding apparatus 100. A connection 115 is made between the control module 120 and the cable feeding apparatus 100 to initiate operation when appropriate according to the examples described below. A switch 112 connects to the control module 120 at connection 113 to allow a user to initiate operation by signaling the control module 120.

The cable pulling apparatus 101 in FIGS. 1A and 2 includes a motor 114 configured to drive a capstan 116 both mounted on a frame 119. A control module 120 is mounted on the frame 119 and includes a first connection 125 to the cable pulling apparatus 101 to initiate operation when appropriate according to the examples described below, and a second connection 127 extending to a switch 118. During operation, the pulling rope is attached to the capstan 116 on the cable pulling apparatus 101. When operation is started, the cable pulling apparatus 101 pulls the pulling rope, which wraps around the capstan 116 as the motor 114 turns. A boom assembly 117 is attached to the cable pulling apparatus 101 to receive the pulling rope and to feed the pulling rope to the capstan 116.

It is noted that the example in FIG. 2 depicts the puller control module 120a connected to the pulling apparatus 101 in wireless communication with the feeder control module 120b connected to the feeding apparatus 100. In other implementations, only one control module 120 is connected to a pulling or feeding apparatus to wirelessly communicate with a feeding or pulling apparatus at an opposite endpoint that includes wireless communications capabilities integrated within the apparatus at the opposite endpoint. It is further noted that in another example, the puller control module 120a may connect to the cable pulling apparatus 101 in wireless communication with another control module 120b used by another operator at the feeder endpoint without the use of the cable feeding apparatus 100. Example configurations are illustrated in FIG. 1B.

FIG. 1B is a table of configurations 170 of cable installing systems in which example implementations may be advantageously used. The table of configurations 170 includes equipment that may be used at a feed side of the cable installation, equipment that may be used at a pull side of the cable installation, and the use, when needed, of a repeater between the feeder side and the pull side at column 175. The table of configurations 170 in FIG. 1B includes:

1. Configuration 172 having a cable feeding apparatus with an integrated wireless communications control module at the feed side 172a and a cable pulling apparatus with an integrated wireless communications control module at the pull side 172b. The control module would not be needed at the endpoints (feed side and pull side) in the example at 172*a* and 172*b* in FIG. 1B. The control module 120 may be implemented in repeater mode between the pull side 172*b* and the feed side 172*a* if needed.

2. Configuration 174 having a cable feeder apparatus using a control module at the feed side 174*a* to communicate with a cable pulling apparatus with an integrated wireless communications control module at the pull side 174*b*. The control module may be used in repeater mode in the example configuration 174*a*, 174*b*.

3. Configuration 176 having a cable feeder apparatus with an integrated wireless communications control module at the feed side 176*a* to communicate with a cable pulling apparatus having a control module at the pull side 176*b*.

4. Configuration 178 having a cable feeder apparatus using a control module at the feed side 178*a* to communicate with a cable pulling apparatus having a control module at the pull side 178*b*.

5. Configuration 180 having a control module at the feed side 180*a* to communicate with a cable pulling apparatus with an integrated wireless communications control module at the pull side 180*b*.

6. Configuration 182 having a control module at the feed side 180*a* to communicate with a cable pulling apparatus with a control module at the pull side 182*b*.

Figure 3A:
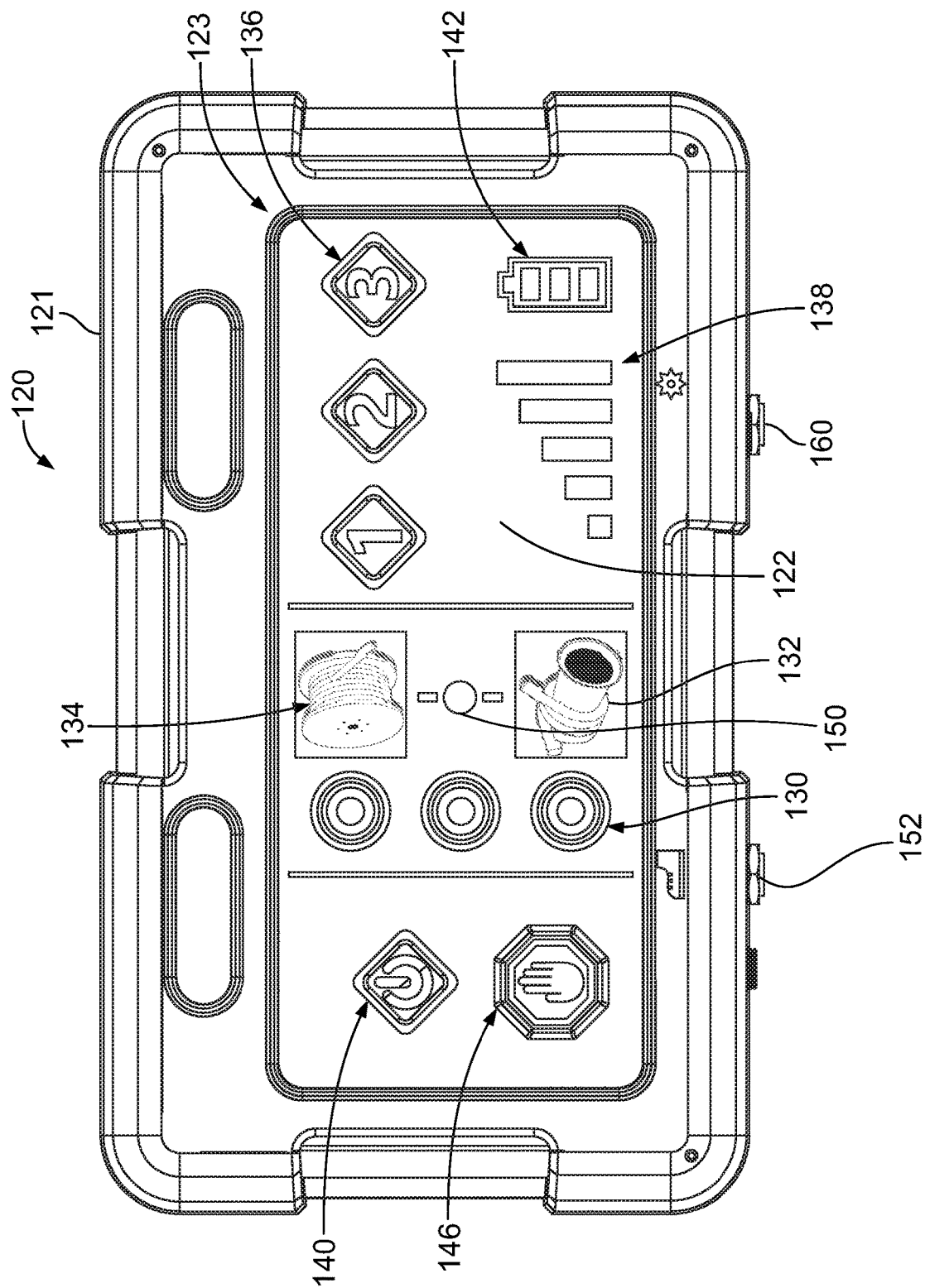
FIG. 3A is a top isometric view of an example implementation of a control module of the type that may be used in the examples illustrated in FIGS. 1A and 1B.
Figure 3B:
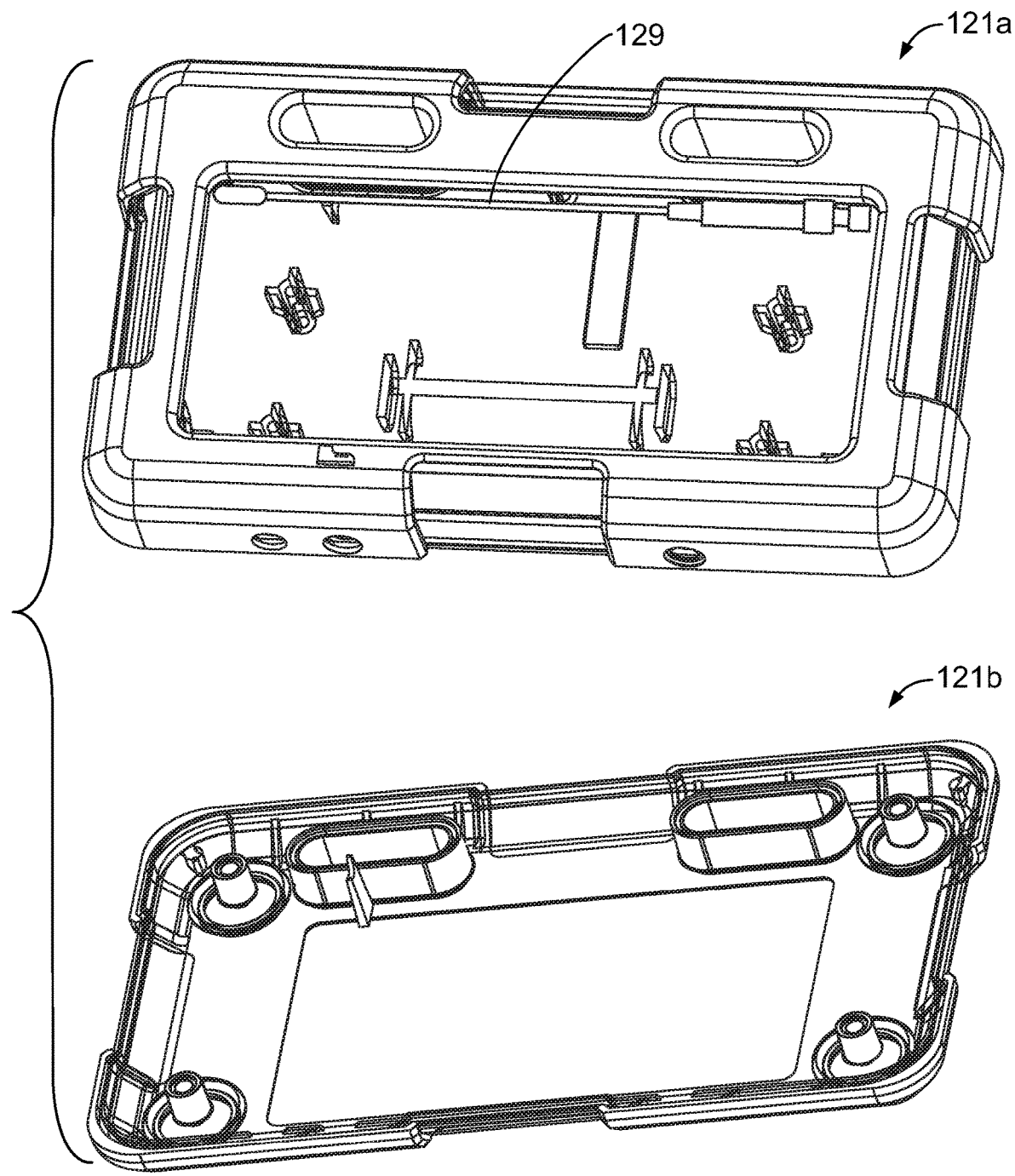
FIG. 3B is a top isometric view of the housing of the control module and an isometric internal view of the top portion of the housing.

FIG. 3A is a top isometric view of an example implementation of a control module of the type that may be used in the examples illustrated in FIGS. 1A and 1B. The control module 120 may include a housing 121. FIG. 3B is a top isometric view 121*a* of the housing 121 of the control module 120 and an isometric internal view of a top portion 121*b* of the housing 121. The top isometric view 121*a* in FIG. 3B depicts the control module housing 121 with the user interface removed to depict a circuit board 131 inside the housing 121.

Referring to FIG. 3A, the control module 120 may be enclosed in the module housing 121 with a user interface 123 on one side of the housing 121. The user interface 123 may include a display 122 for displaying visible alerts or indicators. The display 122 may be a touch-panel having touch-sensitive areas on the display that can be pressed to operate as switches. Accordingly, switch devices as described below may be implemented as switches on a touch-panel display 122. In other implementations, any switches described below may also be of a mechanical press type switch. In some examples, the switches may include a light to illuminate a change in state of the switch.

The control module 120 in FIG. 3A may include mode selection switches 130 to select a mode of operation. The control module 120 allows for the selection of two basic modes, operation as a repeater or as an endpoint. Two endpoint modes may also be available: a feeder endpoint mode to operate at the feed side endpoint (e.g. in FIG. 1B) and a puller endpoint mode to operate at the pull side endpoint (e.g. in FIG. 1B). FIG. 2 depicts the control module 120*a* operating in the cable puller endpoint mode and control module 120*b* operating in the cable feeder endpoint mode. In endpoint mode, the control module 120*a,b* controls the cable puller/feeder equipment on which it is mounted. In repeater mode, the control module 120*c* receives wireless signals from either endpoint control module 120*a,b* and transmits the received wireless signals with higher power. Repeater mode allows an operator to position the control module 120*c* between the endpoints (e.g. at 175 in FIG. 1B) allowing for an extension to the signal path of the wireless signals. The control module 120*c* in repeater mode also allows for a signal to be re-transmitted at a higher power when noise or other obstacles impede a clean signal transmission.

In the endpoint mode, the control module 120 in FIG. 3A may be connected to either a cable puller or cable feeder at one endpoint and configured to communicate wirelessly with the control module 120 connected to the cable feeder or cable puller at the opposite endpoint. The communication between endpoints allows for communication of a ready state or a stop state to allow for coordination between the equipment at the endpoints. In some example implementations, other data may be communicated between the equipment endpoints. For example, real-time data reflecting the status and progress of the pulling operation may be communicated from the puller to the feeder or from the feeder to the puller. A third control module 120 or more than one additional control module 120 may be added to the operation to operate in the repeater mode to ensure a robust radio signal between endpoints.

Cable pulling equipment or apparatuses (either cable pullers or cable feeders) employ a wired connection to start or stop operation of the equipment. The wired connection is typically a foot switch to free the operator's hands for other tasks. In example implementations, the control module 120 may communicate to command the cable equipment to start and stop via a hardwired connection to the cable pulling/feeding apparatus. When the control module 120 receives notification that the opposite endpoint is ready, the control module 120 commands the cable pulling/feeding equipment to start. In example implementations, the control module 120 may include a cable pulling equipment output 160 to allow the control module 120 to start and stop an attached cable pulling/feeding equipment.

The control module 120 in FIG. 3A includes a puller status indicator 132 to indicate the status of the cable pulling apparatus 101 at one endpoint, and a feeder status indicator 134 to indicate the status of the cable feeding apparatus 100 at the other endpoint. The puller status indicator 132 is turned to an on-state (e.g. illuminated) when the cable pulling apparatus 101 is in the ready state. The feeder status indicator 134 is turned on to an on-state when the cable feeding apparatus 100 is in the ready state. If the control module 120 is connected to the cable pulling apparatus 101, the puller status indicator 132 is turned on to indicate the ready state when the operator triggers the switch 112 (in FIG. 1A). The feeder status indicator 134 is turned on when the control module 120 receives a ready message from the cable feeding apparatus 100 at the other endpoint.

The operator may choose one of a plurality of signal channels on which to communicate by pressing a channel selector switch 136. In an example implementation, the control module 120 includes a wireless communication interface that transmits radio signals in a frequency band of 902 to 928 Mhz with software selectable channels for interference immunity. The wireless communications interface includes an antenna 129 mounted on a circuit board 131 disposed in the module housing 121 as shown in the top view 121*a* of the housing 121 in FIG. 3B. The channel selector switches 136 may be connected to tune the radio transmission to a selected one of three channels (as shown in FIG. 3A, other examples may provide for more or fewer channels). A signal strength analyzer may be included in the wireless communication interface to determine a signal strength. The signal strength may be displayed in the display 122 as a signal strength indicator 138 to assist the operator in selecting the best possible channel. In the repeater mode, the channel selectors 136 and signal strength indicator 138 may be used to assist the operator in finding a channel over which two endpoints are communicating.

Example implementations of the control module 120 in FIG. 3A may include an equipment switch input 152 to receive connection to a switch. In example implementations, the switch connected to equipment switch input 152 may be a foot switch. In other implementations, a hand switch or any other type of suitable switch may be connected to equipment switch input 152 as well. The control module 120 receives a trigger of the switch connected to equipment switch input 152 and notifies the control module at the opposite endpoint by sending a ready state message wirelessly to the other endpoint. In example implementations, the trigger of the switch 152 may be the pressing on the switch 112 (in FIG. 1A) by the operator. In example implementations, the operator maintains the switch 112 depressed during operation of the apparatus and lifts the foot off the switch 112 to stop operation. An operator may also press a stop selector 146 on the control module 120 (in FIG. 3A) to generate a message that is transmitted to the other endpoint to alert an operator at the other endpoint to stop the equipment at the other endpoint. The stop selector 146 may also be triggered by an operator at the control module 120c operating in a repeater mode when the operator sees an obstacle or any other reason for why the installation process should be stopped.

The control module 120 may illuminate the apparatus status indicator 132 or 134 to indicate readiness of the equipment at the first endpoint for the operator at the first endpoint. The control module at the opposite endpoint may receive the ready state message from the first endpoint and annunciate the readiness of the first endpoint. The control module at the opposite endpoint may illuminate the apparatus status indicator corresponding to the cable pulling equipment at the first endpoint to notify the operator at the opposite endpoint that the equipment at the first endpoint is ready to operate. The operator at the opposite endpoint may then trigger the switch, or foot switch, of the equipment at the opposite endpoint. The switch trigger illuminates the apparatus status indicator corresponding to the cable pulling equipment at the opposite endpoint on the control module at the opposite endpoint.

In an example implementation, the apparatus connected to the control module 120 may begin operation when the control module 120 sends a start signal to the apparatus responsive to the operator triggering the switch 112. The start signal may be similar to the electrical signal that initiates operation of the apparatus when the switch 112 is connected directly to the apparatus. In another implementation, the triggering of the switch 112 may first send the ready state message to the apparatus at the other endpoint. The control module at the opposite endpoint may acknowledge readiness of the equipment at the first endpoint by wireless communication. The control module 120 at the first endpoint receives an acknowledgment message and illuminates the apparatus status indicator 134 or 132 to notify the operator at the first endpoint that the equipment at the opposite endpoint is ready to operate. When equipment at both endpoints is ready to operate, the control module at each endpoint sends the start signal to its corresponding equipment to initiate operation.

The control module 120 in FIG. 3A includes a power button 140 to start the power source (e.g. a battery, not shown) and a battery charge level indicator 142. The control module 120 also includes a radio transmission status indicator 150, which is illuminated when radio signals are being communicated between endpoints.

Figure 4:
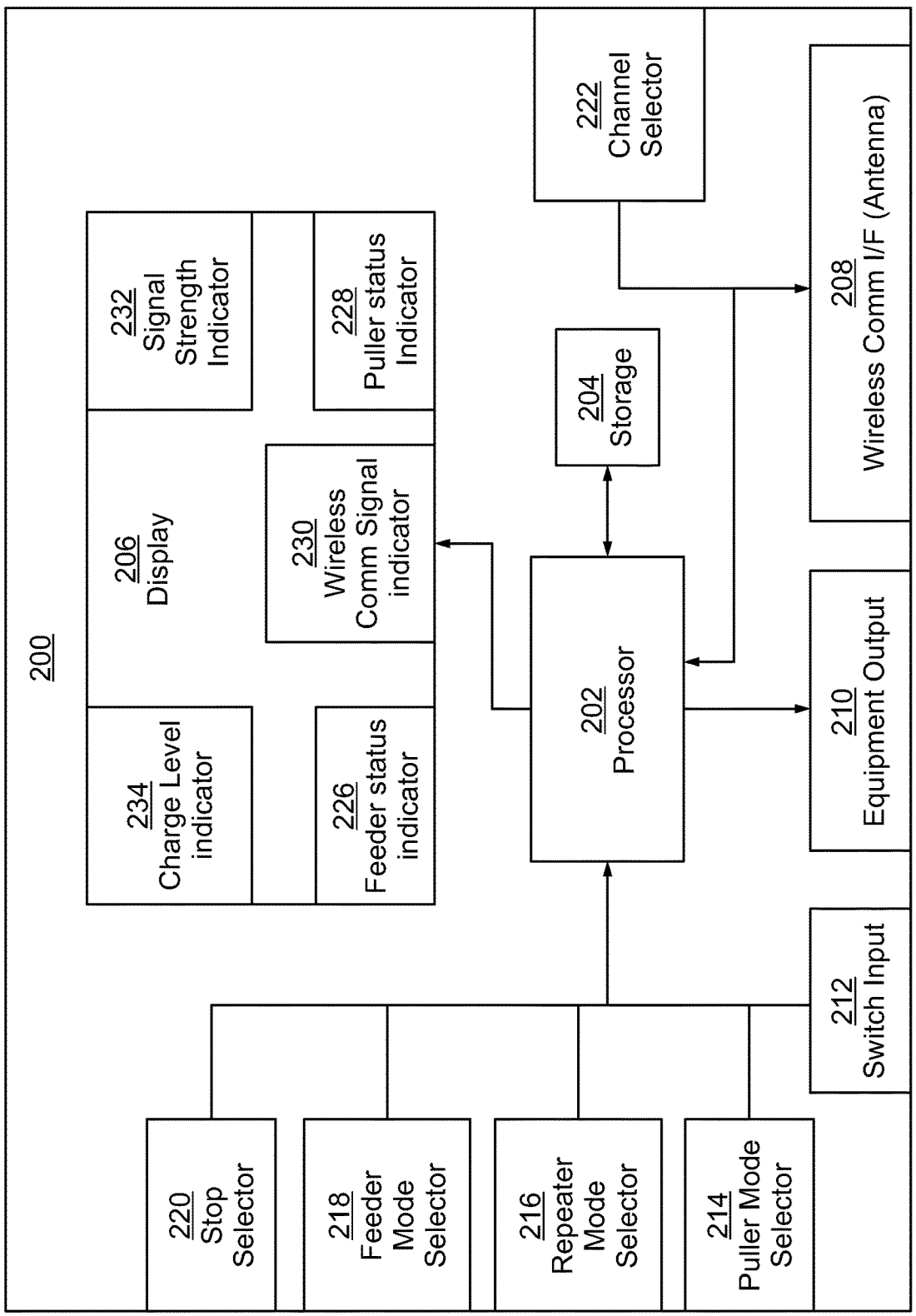
FIG. 4 is a block diagram of an example implementation of a control module.

FIG. 4 is a block diagram 200 of an example implementation of a control module 120 of the type described above with reference to FIGS. 1A, 1B, 2, 3A and 3B. The control module 120 in FIG. 4 includes a processor 202, a storage mechanism 204, a display 206, a wireless communication interface 208, an equipment output 210, a switch input 212, a puller mode selector 214, a repeater mode selector 216, a feeder mode selector 218, and a stop selector 220. The switch input 212 is a connection to an input device. The puller mode selector 214, the repeater mode selector 216, the feeder mode selector 218, and the stop selector 220 are either input devices or connections to input devices. The input devices may be implemented as mechanical buttons or as touch-panel selectors in an example implementation that uses a touch panel for the display. The input devices may also use mechanical buttons having a light emitting device, such as, for example, a light emitting diode that turns on and off as the state of the mechanical switch changes.

The switch input 212 may be a jack for a wire or cable (such as connection 113 in FIG. 1A) that attaches to a foot switch or a hand switch. Similarly, the equipment output 210 may be a jack as well to allow a male connector attached to a cable (such as connection 115 in FIG. 1A) that connects to the cable feeder or puller equipment. In an example implementation, the switch input 212 may be a female connection configured to receive a male jack connector on a cable attached to a switch. The equipment output 210 may be a female connection configured to receive a male jack connector on a male to male patch cord. The processor 202 receives a change of state signal from the switch input 212 indicating that the operator has either pressed or unpressed the switch 112 (in FIG. 1A). Once the cable puller apparatus or the cable feeder apparatus is powered on, the processor 202 outputs a start signal to initiate operation of the cable puller apparatus or the cable feeder apparatus, whichever is attached to the control module 120. The apparatus may be stopped by triggering the switch input to an off state. In example implementations, the operator may release the switch 112 (FIG. 1A), such as for example, by lifting the foot off the foot switch, to stop operation of the apparatus. The operator may stop operation in response to a problem with the pull or feed, or when the end of the pulling rope reaches the cable pulling apparatus, or for any other suitable reason. The operator may press the stop selector 146 on the control module 120 to signal the other endpoint that it is stopping operation. When the control module 120 at the opposite endpoint receives a stop state message, the operator at the other endpoint may release the switch 112 or 118 (FIG. 1A) to stop operation of the other apparatus.

The wireless communication interface 208 may receive messages from the processor 202 to transmit to the other endpoint. In an example implementation, the messages include, for example, a Feeder/Puller ready and a Feeder/Puller stop message. The processor may execute program instructions that format a message and sends the message to the wireless communications interface 208. The wireless communications interface 208 then transmits the message according to a communications protocol for encoding and decoding messages. In example implementations, the wireless communications interface may be implemented using any suitable wireless technology, such as, for example, Bluetooth, Bluetooth Low Energy, WiFi, etc. or any other technology suitable for implementing a local area network, a micro network, a pico network, or any other suitable wireless network. In some example implementations, an ad hoc network may be designed using a communication protocol implemented using a simple signal modulation scheme. In other implementations, a communications protocol may be configured to include messages, commands, and other data transport schemes. In one example implementation, a ready state message and a stop state message are communicated between endpoint control modules. In other example implementations, additional messages and data may be communicated between endpoint control modules.

In an example implementation, one or more channel selectors 222 may be mounted on the control module housing and connected to the wireless communication interface 208 and the processor 202. When the operator selects the one or more channel selectors 222, the processor 202 and the wireless communications interface 208 switch to communicate on the selected channel.

The display 206 may be any suitable electronic display that may be configured to display images. The images may be areas of the display 206 that are illuminated to indicate one state and turned off to indicate another state. The images may have a form indicating the component or the state that is indicated. For example, the display 206 may include a feeder status indicator 226 shown on the display in the image of a cable feeder as shown in FIG. 1C. The feeder status indicator 226 may be illuminated to indicate the cable feeder is ready or turned off when the cable feeder is not ready for operation. The display 206 may include a puller status indicator 228 shown on the display in the image of a cable puller as shown in FIG. 3A. The puller status indicator 228 may be illuminated to indicate the cable puller is ready or turned off when the cable puller is not ready for operation. In another implementation, the feeder status indicator 226 and the puller status indicator 228 may be illuminated to indicate the equipment whose control module 120 is in the process of communicating wirelessly.

The display 206 may include a signal strength indicator 232 to indicate the current strength of the radio signal being communicated by the control module 120. As shown in FIG. 3A, the signal strength indicator 232 may graphically indicate levels of strength. In alternative embodiments, the signal strength may be indicated qualitatively as being good, ok, and bad, for example. The display 206 may provide the signal strength indicator 232 with color to provide added information. For example, when the stop button is pressed or when a stop state message is received from the other endpoint, the signal strength indicator 232 may display the signal lights in red, or flashing red. The signal lights in the signal strength indicator 232 may also illuminate in green during endpoint to endpoint communication. If the control module 120 is in repeater mode, the signal lights in the signal strength indicator 232 may flash green periodically to show that the control module 120 is in endpoint to endpoint communication.

The display 206 may also include a charge level indicator 142 to communicate the current charge level of the power source, which may be a battery. The battery may be rechargeable. The charge level indicator 142 may communicate to the operator when it may be time to connect the control module 120 to a charger.

It is noted that in other implementations, the display 206 may be implemented using individual lights. For example, LEDs may be distributed on the surface of the control module 120 and controlled as described herein to provide a similar functionality.

The processor 202 may be any suitable logic processing device configured to execute machine instructions, which may be stored in a storage mechanism 204. The processor 202 communicates with the input devices and the output devices over a suitable bus, or internal communications interface. Any suitable processor may be used.

Figure 5A:
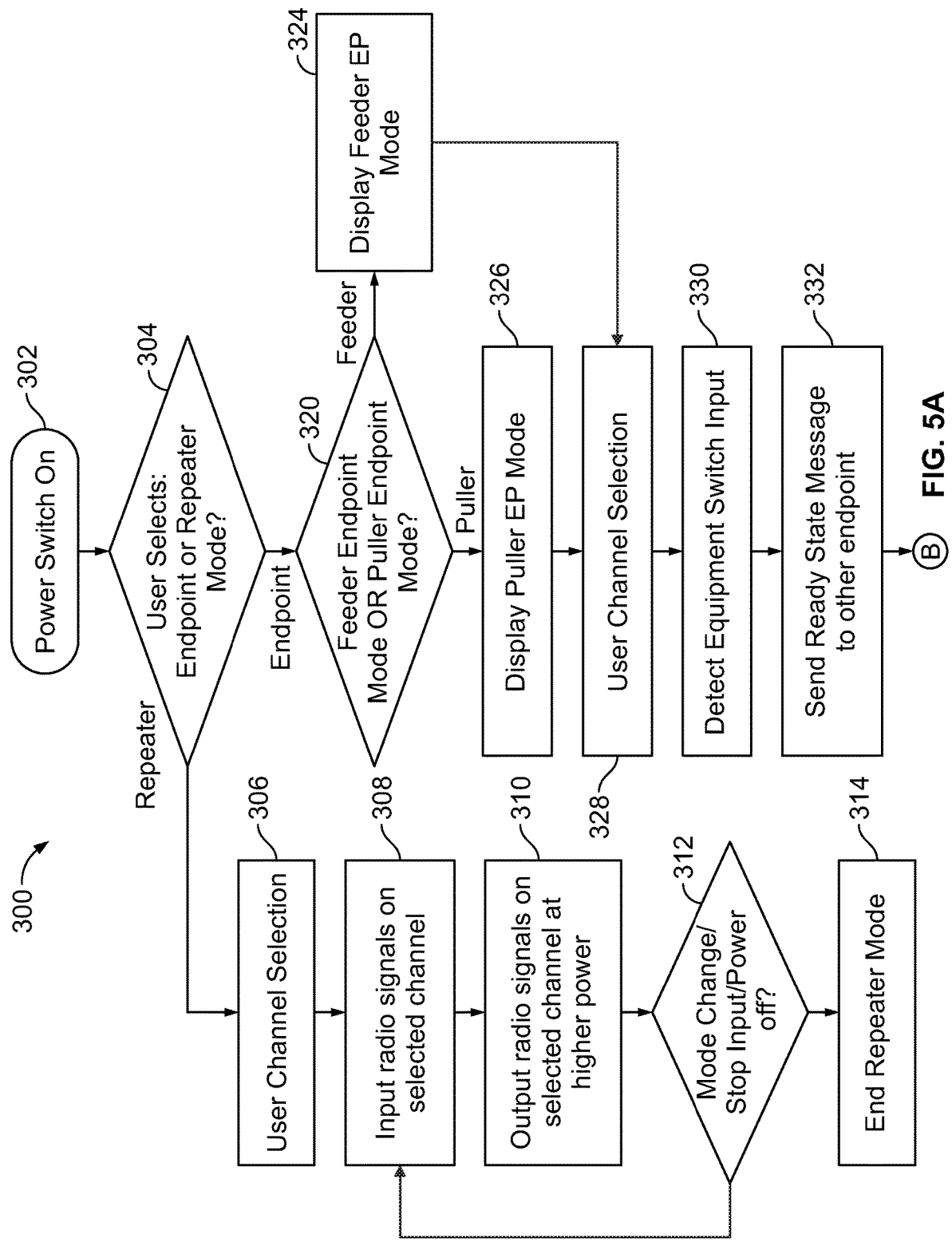
FIGS. 5A and 5B are flowcharts illustrating operation of an example method for controlling a cable installing system.
Figure 5A:
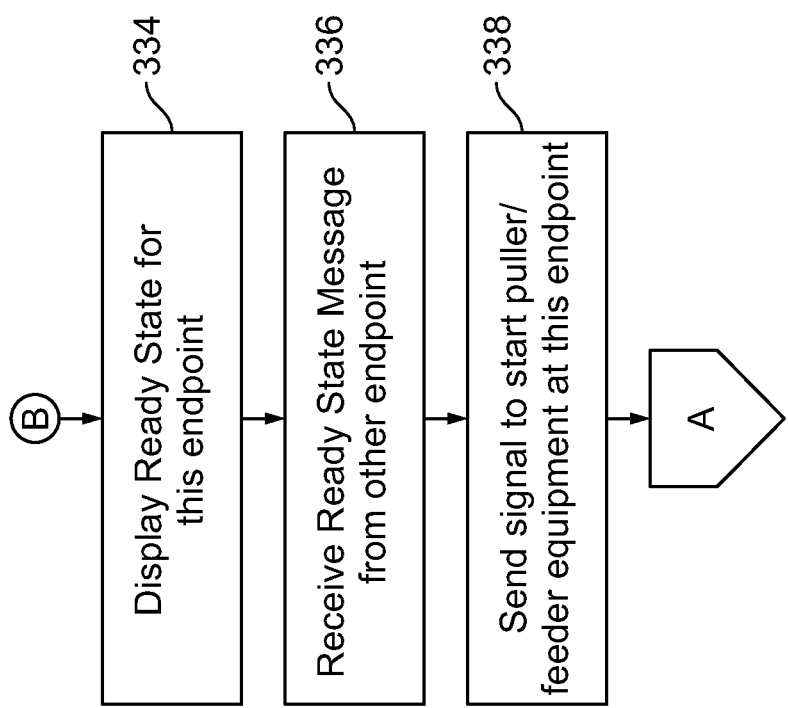
Figure 5B:
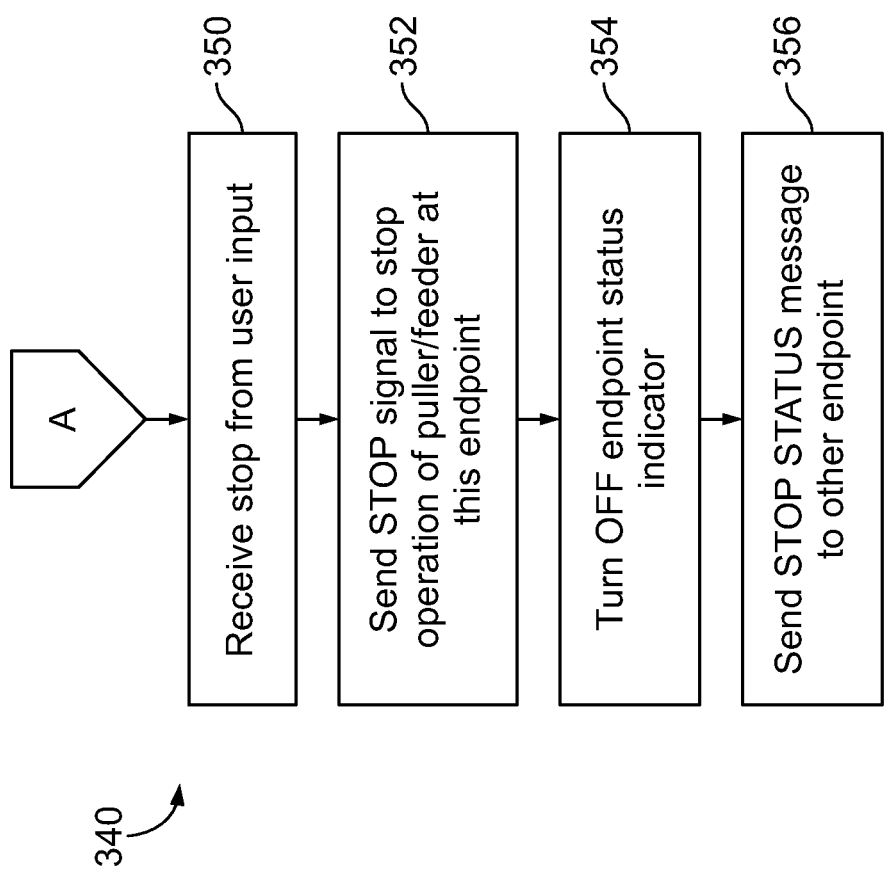

FIGS. 5A and 5B are flowcharts illustrating operation of example methods for wirelessly controlling a cable installing system. FIG. 5A is a flowchart 300 illustrating example methods for initiating a cable pulling operation in accordance with example implementations of the control module described with reference to FIG. 4. FIG. 5B is a flowchart 340 illustrating methods for stopping operation of the cable pulling operations. The description of the flowcharts below is made with reference to example implementations of the control module as described in FIGS. 1A-4 above unless otherwise specified. The configuration used as an example is configuration 178 in FIG. 1B wherein a control module is connected to control the cable installing equipment at each endpoint. Those of ordinary skill in the art will understand the use of the control module in other configurations from the description below with reference to FIGS. 5A and 5B.

A cable pulling and feeding operation may be initiated by first positioning the cable feeding apparatus 100 at one endpoint and the cable pulling apparatus 101 at the opposite endpoint in a manner similar to the setup illustrated in FIG. 2. At the pulling endpoint, a spool of pulling rope is positioned and the pulling rope is fed through the conduit towards the feed side. The pulling rope is attached to a cable on a spool on the feeder side. The free end of the cable on the spool is fed through the rotating members on the cable feeder apparatus to attach to the pulling rope between the conduit exit/entrance and the cable feeding apparatus. The puller then pulls on the pulling rope to pull the cable into the conduit as the feeder feeds the cable from the spool An operator may be positioned at each endpoint through the process of setting up the operation, but only one operator at one endpoint need remain to monitor the operation.

At step 302, the operator at each endpoint switches the power of the control module at the operator's corresponding endpoint to ON. When powered on, the control module may perform an initialization process before waiting for the operator to begin. At decision block 304, the operator selects an operating mode. It is noted that the example illustrated in FIG. 2 depicts operation of the system using three control modules 120*a,b,c*. Control module 120*a* and control module 120*b* are positioned to operate as endpoint control modules. Control module 120*c* is positioned to operate as a repeater. For control module 120*c*, an operator may select the repeater mode, which executes to step 306. At step 306, the operator selects a channel on which to operate as a repeater. The channel selection may be made beforehand. Once the endpoint control modules are positioned, the operators may test each channel to determine the channel communicating the strongest signal. At that point, an operator may go back to the repeater control module 120*c* to select the same channel as the endpoint control modules 120*a,b*. At step 308, the control module 120*c* receives radio signals as input on the selected channel. At step 310, the received radio signals may be transmitted by the repeater control module 120*c* via the wireless communication interface of the repeater control module 120*c*. By re-transmitting the radio signals at the wireless communication interface, the radio signals are amplified relative to the radio signals received at step 308. At decision block 312, the control module may be interrupted by a mode change (to endpoint), a stop command, or a power off. If the mode changes, a stop command is received, or power off is detected, the operation of the repeater control module 120*c* is ended at step 314.

It is noted that the repeater mode provides a line of sight for the wireless communications when distance or obstacles affect the communication. Accordingly, an operator may be positioned near the repeater control module. When the control module receives the stop command responsive to the operator pressing the stop selector 146 on the control module, the control module in repeater mode may send stop status messages to the control modules operating at the endpoints. The operator may press the stop selector 146 if the operator sees circumstances affecting the cable installation within the conduit that require the operation be halted. For example, one such circumstance may involve a construction operation that affects the state of the conduit in which the cable is being installed.

Referring back to step 304, the operator at each endpoint selects the endpoint mode for the control module at the corresponding endpoint. The operator at each endpoint may select either a feeder endpoint mode or a puller endpoint mode. The operator at the feeder endpoint selects the feeder endpoint mode transferring execution to step 324. At step 324, the control module illuminates a light emitter on the feeder endpoint mode selector 132 in FIG. 3A to indicate that the feeder endpoint mode is selected. The operator at the puller control module 120a selects the puller mode selector at decision block 320. At step 326, the puller control module 120a may illuminate a light emitter at the puller endpoint mode selector 134 in FIG. 3A to indicate that the puller endpoint mode is selected. After displaying the endpoint mode selected, the control module at each endpoint performs a channel selection process at step 328. The channel selection process may be performed by each operator selecting a channel selector 136. The operators may check each channel to identify the channel with the strongest signal.

The endpoint control modules at step 328 should be communicating signals and waiting for an operator input signal. At step 330, the operator actuates the switch 112, 118 (FIG. 1A) connected to the switch input. In an example implementation, the operator presses the switch 112, 118 and leaves the switch 112, 118 depressed as long as the operator desires to have the apparatus operate. When the equipment switch input is detected by the control module, the control module sends a ready state message to the opposite endpoint control module at step 334. In addition, the control module 120 may also illuminate the apparatus status indicator corresponding to the equipment connected to the control module. The puller endpoint control module 120a illuminates the puller status indicator 132 (in FIG. 3A) and the feeder endpoint control module 120b illuminates the feeder status indicator 134. At step 336, the control module 120 receives a ready state message from the opposite endpoint. The puller control module 120a illuminates the feeder status indicator 134 on the puller endpoint control module 120a. The feeder control module 120b illuminates the puller status indicator 132 on the feeder control module 120a. At step 338, each control module 120a,b has sensed that both endpoints are ready to begin the pulling operation and sends a start signal to the corresponding puller/feeder apparatus connected to each control module 120 to command the equipment to begin operating.

Once both the feeding apparatus and the pulling apparatus are operating, the feeding apparatus feeds cable into the conduit 107 as the pulling apparatus pulls on the cable at the opposite endpoint. Referring to FIG. 5B, the operator may note that the pulling process is nearing completion. At point deemed appropriate by the operator, the operator may press the stop selector 146 (FIG. 3A) to stop the operation at step 350. At step 352, the control module 120a,b at which the operator pressed the stop switch detects the pressing of the stop selector and sends a stop message to the cable pulling apparatus or cable feeding apparatus connected to the control module to turn the equipment off. At step 354, the puller status indicator or the feeder status indicator at the endpoint at which the operator pressed the stop selector is turned off. At step 356, the control module at which the operator pressed the stop selector sends a stop message to the endpoint control module at the opposite endpoint. The opposite endpoint control module then sends an stop status message to the cable pulling or feeding apparatus attached to the opposite endpoint control module to turn the equipment off thereby ending the operation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A control module in a cable installing system including an apparatus configured to install a cable through a conduit between a first endpoint and a second endpoint, the control module comprising:

a switch input configured to connect to a user-actuated switch to receive an operator input signal;

an equipment output configured to connect to the apparatus to communicate a start signal to initiate operation of the apparatus;

a stop selector configured to indicate a stop state when pressed by the operator;

where the control module is configured to operate in an endpoint mode or a repeater mode;

a wireless communication interface configured to transmit an apparatus status signal indicating a ready state or the stop state for the apparatus to the other endpoint when the apparatus is connected to the control module, and to communicate apparatus status signals between the first endpoint and the second endpoint when the control module is in a repeater mode; and a processor configured to execute stored machine instructions to:

when the control module is operating in the endpoint mode:

receive the operator input signal and transmit via the wireless communication interface a ready message indicating readiness of the apparatus to the second endpoint, receive a ready state signal indicating readiness at the second endpoint via the wireless communication interface, initiate operation of the apparatus by sending the start signal to the apparatus via the equipment output responsive to receiving the ready state signal; and when the control module is operating in the repeater mode:

communicate apparatus status signals between the first endpoint and the second endpoint, and send the apparatus status signal in the stop state to the first and second endpoints responsive to the user pressing the stop selector.

2. The control module of claim 1 where:
the apparatus is a first apparatus, and
the wireless communication interface is configured to transmit the apparatus status signal to a second apparatus having an integrated wireless communication interface and an apparatus controller configured to communicate the ready state signal via the integrated wireless communication interface.

3. The control module of claim 1 where the apparatus is a first apparatus, the control module is a first control module, and the cable installing system comprises the first apparatus and a second apparatus connected to a second control module.

4. The control module of claim 3 where the first apparatus is either a cable pulling apparatus or a cable feeding apparatus, the second apparatus is either a cable feeding apparatus or a cable pulling apparatus, the apparatus status signal is a first apparatus status signal, and the second apparatus transmits a second apparatus status signal, the control module further comprising:
a display configured to display a puller status indicator according to the ready state or stop state of the cable pulling apparatus, and a feeder apparatus status indicator according to the ready state or stop state of the cable feeding apparatus; where the processor:
illuminates the puller status indicator responsive to receiving the operator input signal and the feeder status indicator responsive to receiving the second apparatus status signal when the first apparatus is the cable pulling apparatus; and
illuminates the feeder status indicator responsive to receiving the operator input signal and the puller status indicator responsive to receiving the second apparatus status signal when the first apparatus is the cable feeding apparatus.

5. The control module of claim 4 further comprising:
a puller endpoint mode selector to indicate a puller endpoint mode when an operator presses the puller endpoint mode selector and the first apparatus is the cable pulling apparatus; and
a feeder endpoint mode selector to indicate a feeder endpoint mode when the operator presses the feeder endpoint mode selector and the first apparatus is the cable feeding apparatus.

6. The control module of claim 4 where:
the wireless communications interface includes a signal strength analyzer; and
the display is configured to display a signal strength indicator indicative of a signal strength measured by the signal strength analyzer.

7. The control module of claim 1 further comprising:
a repeater mode selector configured to trigger the processor to enter the repeater mode when selected by the operator, where in the repeater mode, the control module receives wireless signals at the wireless communications interface and transmits the received wireless signals at a higher power.

8. The control module of claim 1 where the user-actuated switch is a foot switch or a hand switch.

9. The control module of claim 1 further comprising:
a repeater mode selector configured to trigger the processor to enter the repeater mode when selected by the operator, where in the repeater mode, the control module receives wireless signals at the wireless communications interface and transmits the received wireless signals at a higher power, and where the processor is further configured to send the apparatus signal in the stop state to both endpoints.

10. The control module of claim 1 where:
the wireless communications interface includes a plurality of wireless communications channels.

11. The control module of claim 10 further comprising:
a plurality of channel selectors configured to enable communications on the corresponding wireless communication channel selected by the operator.

12. The control module of claim 1 further comprising:
a battery configured to provide electrical power to the control module.

13. The control module of claim 12 where the display is configured to display a battery level indicator showing a charge level in the battery.

14. The control module of claim 1 further comprising:
a module housing configured to contain the control module, the module housing including a mounting mechanism configured to attachably mount the module housing to the first cable pulling apparatus.

15. The control module of claim 14 where the mounting mechanism on the module housing comprises at least one magnet configured to affix the module housing to a metal surface on the cable pulling apparatus.

16. The control module of claim 15 where the mounting mechanism on the module housing comprises at least one through-hole configured to receive a fixing device.

17. The control module of claim 16 where the fixing device is a screw, a dowel, or a hook.

18. A method for controlling an apparatus at a first endpoint for installing a cable in conduit between the first endpoint and a second endpoint, the method comprising:
selecting an endpoint mode or a repeater mode at a control module connected to control the apparatus;
when the endpoint mode is selected at the control module:
receiving an operator input signal indicating a ready state for initiating a cable installing function by the apparatus;
illuminating an apparatus status indicator on a display on the control module;
sending a message indicating that the apparatus is in the ready state to the second endpoint over a wireless communication interface;
receiving a message indicating that the second endpoint is in the ready state;
illuminating the apparatus status indicator in the display;
sending a start signal to the apparatus to start installing cable; and
when the repeater mode is selected at the control module:
receiving wireless signals from one of the first endpoint or second endpoint over the wireless communication interface;
transmitting the wireless signals to one of the second endpoint or first endpoint via the wireless communication interface; and
sending a stop signal to the first and second endpoints when a stop selector is pressed by the operator.

19. The method of claim 18 where the apparatus is a first apparatus operating as either a cable pulling apparatus or a cable feeding apparatus, the cable installing system comprises a second apparatus operating as a cable feeding apparatus or a cable pulling apparatus, where:

the step of receiving the message indicating the second endpoint is in the ready state comprises receiving the message indicating the second apparatus is in the ready state.

\* \* \* \* \*

UNITED STATES PATENT AND TRADEMARK OFFICE
CERTIFICATE OF CORRECTION

PATENT NO. : 11,361,656 B2
APPLICATION NO. : 17/005885
DATED : June 14, 2022
INVENTOR(S) : Marben et al.

Page 1 of 1

It is certified that error appears in the above-identified patent and that said Letters Patent is hereby corrected as shown below:

On the Title Page

Item (72), in Column 1, under "Inventors:", Line 4, delete "Deraid" and insert -- Derald --, therefor.

Signed and Sealed this
Twenty-sixth Day of July, 2022

Katherine Kelly Vidal
*Director of the United States Patent and Trademark Office*